2,899,423

MANUFACTURE OF CELLULOSE ACETATE

Carl J. Malm and Carlton L. Crane, Rochester, N.Y., assignors to Eastman Kodak Company, Rochester, N.Y., a corporation of New Jersey No Drawing. Application August 23, 1957
Serial No. 680,021

7 Claims. (Cl. 260—227)

This invention relates to a process for the manufacture of cellulose acetate in which cellulose is initially treated with a mixture of acetic acid and acetic anhydride at an elevated temperature for a time sufficient to destroy not more than 50% of the water in the cellulose, subsequent to that treatment esterifying the cellulose by adding sulfuric acid catalyst under cooled conditions, raising the external temperature when the temperature of the reaction mass starts to taper off and completing the esterification under those conditions.

In the manufacture of cellulose acetate various methods of manufacture have been employed, in which the esterification bath essentially consists of acetic anhydride, acetic acid and an esterification catalyst, usually sulfuric acid. In conventional procedures for commercially producing cellulose acetate, cellulose is reacted upon by mixing with an esterification bath comprising acetic anhydride and sulfuric acid catalyst and during a considerable portion of the reaction procedure the mass is subjected to cooling to assure good control.

With various types of pretreatments for cellulose the use of more than a small amount of sulfuric acid catalyst in the subsequent esterification procedure has led to difficulties in controlling the activity of the reaction. In many of these procedures for the pretreatment of cellulose the cellulose has been detrimentally affected, and, hence, the products which have resulted have had undesirable properties. In some types of pretreatments it has been advantageous to use a low ratio of acetic acid to cellulose in the pretreatment operations. In procedures of that kind the proportion of liquid to solid has been so low that excessive strain has been put on the equipment employed in mixing the cellulose with the liquids used in this treatment. This has necessitated the use of separate equipment for the pretreatment operation. In some types of pretreatments, even using a mixture of acetic acid and acetic anhydride, the cellulose has been treated for a length of time such that the moisture has been completely eliminated from the cellulose and hence the subsequent esterification has been difficult due to excessively slow diffusion of the reagents into the cellulose fiber.

One object of our invention is to provide a procedure for the manufacture of cellulose acetate in which the cycle employed is considerably shortened from that which has been previously thought to be necessary. Another object of our invention is to provide a process for the manufacture of cellulose acetate in which good temperature control of the esterification step is possible even with the use of a relatively high concentration of sulfuric acid catalyst in the esterification procedure. A further object of our invention is to provide a process for making cellulose acetate in which process cellulose is rendered reactive without being susceptible to undesirable effects from sulfuric acid catalyst. A still furtheer object of our invention is to provide a process for the manufacture of cellulose acetate in which the pretreatment operation may be conveniently carried out in a conventional esterification mixer. Other objects of our invention will appear herein.

We have found a process for preparing cellulose acetate in which the esterification procedure goes at a relatively rapid rate, but yet there is no run away or difficulty of control in imparting the acetyl content to the cellulose in the esterification operation. In procedures in accordance with our invention the complete time from the initial treatment of the cellulose to the completion of the esterification is short with the advantage that the esterification equipment is tied up for no more than the operation of a short cycle as necessary in accordance with our invention.

Our invention involves the manufacture of cellulose acetate in which cellulose is treated with a mixture of acetic anhydride and acetic acid at an elevated temperature for but a short time during which no more than 50% and preferably no more than 25% of the water in the cellulose is destroyed by the anhydride. In the esterification procedure the mass is subjected to cooling for a short time following which the jacket temperature of the esterification vessel is elevated, at which elevated temperature the esterification is permitted to go to completion.

Our invention is particularly adapted to processes of the large batch type and those in which a cooling jacket is used in regulating the course of the reaction. In operating in accordance with our invention cellulose which has been dried such as down to 1–7% moisture content is esterified. The cellulose is pretreated with a mixture of acetic anhydride and acetic acid only for a short time. The proportion of acetic anhydride used is desirably 30–80% based on the total weight of the liquid. The amount of acetic anhydride employed is an amount sufficient for the subsequent acetylation but no more than 3.5 parts per part of cellulose, the pretreatment being carried out in the complete absence of any esterification catalyst. Thus, the pretreatment in accordance with our invention is ordinarily carried out by using substantially the same liquid to cellulose ratio that is employed in the esterification reaction itself. The cellulose is treated with the liquid pretreating bath at temperatures in the range of 80–180° F. and for a time within the range of ¼ to 2 hours, the time being so controlled that not more than ½ of the water in the cellulose is removed thereby. Ordinarily a treatment of less than an hour will give the desired effect although longer times within the range specified can be used provided at least half the water in the cellulose remains after this treatment.

After the cellulose has been pretreated, the temperature in the jacket of the esterification vessel is dropped, thus cooling the mass which consists of cellulose containing some moisture, acetic anhydride and acetic acid, such as down to a temperature of 35–50° F. There is then added sulfuric acid catalyst usually in the form of its solution in acetic acid, the proportion of sulfuric acid which is used being within the range of 5–12% based on the weight of the cellulose which is to be esterified. This addition of the sulfuric acid catalyst causes the temperature of the mass to rise but after a time depending among other things on the size of the batch and the efficiency of the cooling the temperature starts to flatten out. The temperature of the jacket of the esterification vessel is then raised so as to promote the esterification, the temperature also being that which prevents gelation in the reaction mass. The temperature of the reaction mass is ordinarily a maximum within the range of 80°–130° F. and is governed by several features such as the initial chain length of the cellulose, the liquid:solid ratio in the esterification bath (which in esterifications in accordance with our invention is within the range of 5 to 12:1) and the percent of acetic anhydride in the total bath. In esterification procedures of large size such as those which use 400–600 pounds of cellulose as the starting material, the reaction will procede 40–60 minutes after the addition of the sulfuric acid catalyst before the temperature of esterification begins to flatten out. In the case of small batches, such as using 2 to 3 pounds of cellulose as a starting material, the flattening out of the temperature may occur 4 or 5 minutes after the addition of the sulfuric acid catalyst, whereas in medium size batches such as where 60 pounds of cellulose are employed as the starting cellulose the flattening out of the temperature would occur in a range of 10–30 minutes.

The products obtained by making cellulose acetates in accordance with our invention appear to be unique in that the viscosity of the cellulose acetate so prepared in concentrated solution is lower than the viscosity of conventionally prepared cellulose acetate of the same intrinsic viscosity. As the intrinsic viscosity of the cellulose ester is indicative of the chain length of the cellulose this property which is characteristic of cellulose acetates made in accordance with our invention make possible the dissolving of high proportions of cellulose acetates of good degrees of polymerization in the forming of products therefrom.

In the preparation of cellulose acetates in accordance with our invention the times employed in the esterification proper, are low but yet there has been no danger of run-away or difficulty of control in carrying out the esterification step in contrast with many procedures employed heretofore in the making of cellulose acetate. In procedures in accordance with our invention the pretreatment times are ordinarily small as compared to pretreatment times in procedures described in the prior art for making cellulose acetates. This has lead in the manufacture of cellulose acetate by our own invention to the characteristic that the esterification vessel is in use for a minimum of time per batch.

After the cellulose has been pretreated and acetylated the process is completed by neutralizing all or part of the esterification catalyst and by adding aqueous acetic acid so as to impart a small water content to the mass, such as to result in an acetic acid of 85–92% concentration. If a substantially fully esterified product is desired the mass is then held at an elevated temperature for a time sufficient to stabilize the cellulose acetate by removing sulfuric acid radicals which may be present therein. Products are thereby obtained of excellent heat stability. If a hydrolyzed product is desired only part of the catalyst is neutralized and the ester is hydrolyzed until desired solubility is obtained. The esters obtained in accordance with our invention are useful for preparing the products for which cellulose acetate has been used heretofore such as sheeting, film base, yarn or any other capacity in which cellulose acetates are known to be useful. The procedures defined herein may be employed either for the preparation of unhydrolyzed cellulose acetate or cellulose acetate which has been subjected to hydrolysis by the conventional procedures for preparing cellulose acetates having acetone solubility. The following examples illustrate our invention:

Example 1

500 pounds of acetylation grade wood pulp having a moisture content of approximately 2½% and a cuprammonium viscosity of 2000–3000 centipoises was placed in a conventional jacketed esterification mixer along with a mixture of 1,500 pounds of acetic anhydride and 2,800 pounds of acetic acid. The mixer was run for 30 minutes at a temperature of 100° F. the temperature of the jacket being somewhat more until the 100° temperature was obtained.

The mass was cooled to 35° F. and, with the temperature of the jacket at 25° F., there was added to the mixer over a period of 8 minutes a solution of 36.3 pounds of sulfuric acid (95%) in 200 pounds of acetic acid. The jacket temperature was maintained at 25° F. until after about 1 hour when the temperature of the mass started to flatten out, whereupon it was raised to 72° F. and then to 105°–110° F. The reaction reached completion in about 1½ hours after the addition of the catalyst.

There was then added to the mass 119 gallons of 67% aqueous acetic acid heated to 180° F. and sufficient magnesium oxide to neutralize all the catalyst present. The mass was maintained at 150° F. for 1 hour, whereupon the temperature was raised to 180° F. and was held for 3 hours. A cellulose acetate of good properties was obtained which material had an intrinsic viscosity of 1.98 and a viscosity at 18.2% concentration in methylene chloride:methyl alcohol (84:16) at 25° C. of 54 seconds.

The cellulose acetate obtained was separated from the mass by precipitating in distilled water at 180° F. was washed with distilled water until free of acid, and was dried at 150° F. The product had an acetyl content of 43.6%.

Example 2

500 pounds of acetylation grade cotton linters containing 2–2.4% of moisture was placed in a jacketed sigma-bladed mixer together with a mixture of 1,500 pounds of 97% acetic anhydride and 2,800 pounds of acetic acid. The mass was stirred for 15 minutes at 100° F. and then was cooled to 35° F. The moisture content of the cellulose had been reduced to 1.7%.

After the mass had been cooled to a temperature of 35° F. and with the jacket of the esterification mixer at 25° F. there was added 37½ pounds of sulfuric acid (95%) in 200 pounds of acetic acid over a period of 8 minutes. After 45 minutes the temperature of the jacket was raised to 32° F. and 5 minutes later was raised to 97° F. for 10 minutes and then to 108° F. The mass remained at that temperature for 30 minutes. The total reaction time was approximately 1½ hours.

There was then added to the mass 119 gallons of 67% aqueous acetic acid heated to 180° F. and sufficient magnesium oxide to neutralize the sulfuric acid catalyst remaining in the mass. The mass was held at 150° F. for 1 hour and then raised to 180° F. and held for 3 hours. The product obtained had an acetyl content of 43.4% an intrinsic viscosity of 2.14 and a viscosity at 18.2% concentration in methylene chloride:methyl alcohol (84:16) at 25° C. of 66 seconds.

Example 3

500 pounds of acetylation grade cotton linters having a cuprammonium viscosity of 5,000–10,000 centipoises and a moisture content of 2.4% was placed in a jacket sigma-bladed mixer together with a mixture of 1,500 pounds of 97% acetic anhydride and 2,800 pounds of acetic acid. The mixture was stirred and the temperature was raised to 100° F. and held for 15 minutes.

The mass was cooled to 36° F., the jacket temperature was lowered to 26° F. and a solution of 43.7 pounds of sulfuric acid (95%) in 200 pounds of acetic acid was added over a period of 7 minutes. After reacting for 45 minutes, the jacket temperature was raised to 39° F. After 15 minutes the jacket temperature was raised to 60° F. and in a couple of minutes to 100° F., whereupon the reaction was completed in 25 minutes, thus making for a total esterification time after the addition of the sulfuric acid catalyst of about 1½ hours.

There was added to the mass 119 gallons of 67% aqueous acid heated to 180° F. containing sufficient magnesium oxide to neutralize all the sulfuric acid catalyst. The mass was held at 150° F. for 1 hour, whereupon the temperature was raised to 180° F. and held for 3 hours. The cellulose acetate obtained was separated from the mass by precipitating in distilled water at 180° F., was washed with distilled water until free of acid, and was dried at 150° F. The cellulose acetate obtained had an acetyl content of 43.6% an intrinsic viscosity of 1.98 and a viscosity at 18.2% concentration in methylene chloride:methyl alcohol (84:16) at 25° C. of 41 seconds.

*Example 4*

3 pounds of refined acetylation grade wood pulp having a moisture content of 4.1% was placed in a Werner-Pfleiderer jacketed sigma-bladed mixer together with 7.7 pounds of 97% acetic anhydride and 13.2 pounds of acetic acid. The temperature was raised to 100° F. and the pretreatment was for 15 minutes.

The mass was cooled to 50° F. using a 36° F. jacket temperature, and 48.2 cc. of 95% sulfuric acid in 0.1 pound of acetic acid was added. The jacket temperature was raised to 40° and after 5 minutes to 75°. In 15 minutes the jacket temperature was raised to 100°, then to 120° over a period of 20 minutes, then to 130°, and finally to 140° F. The total reaction time was approximately 2½ hours. The product obtained was found to have a tetrachlorethane-acetic acid (1:1) first stage viscosity of 46 seconds.

There was added to the esterification mixture 7 pounds of 61.5% aqueous acetic acid containing 0.088 pounds of magnesium carbonate, this addition being made over a period of 30 minutes. The mass was then held at 115° F. until analysis of a small sample of the cellulose ester obtained showed an acetyl content of 39%. The cellulose acetate obtained had a viscosity in 97.5% acetone (4:1 ratio) at 20° C. of 17.3 seconds or 10,294 centipoises. A 7:1 liquid to cellulose ratio was used in the esterification.

*Example 5*

9 pounds of refined acetylation grade wood pulp having a moisture content of 2.1% was placed in a Werner-Pfleiderer jacketed sigma-bladed mixer together with 23.1 pounds of 97% acetic anhydride and 39 pounds of acetic acid. After stirring for 15 minutes at 100° F. the mass was cooled to 50° F. by the use of a 34° F. jacket temperature.

There was then added to the mass 243 cc. of 94.7% sulfuric acid in 0.9 pounds of acetic acid. The jacket temperature was raised to 40° F. at the start of the addition of catalyst and was maintained for 5 minutes during which the reaction temperature rose to 80° F. The jacket temperature was then raised to 75° F. and maintained for 15 minutes. The reaction temperature rose to 106°. The jacket temperature was then raised to 110° F. for 8 minutes and the temperature remained at 106°. The jacket temperature was then raised to 125° F. over a period of 7 minutes and was maintained there for 30 minutes. The reaction temperature rose to 120 and then to 128° F. The jacket temperature was maintained at 140° until the completion of the reaction. The total reaction time was approximately 2½ hours. Cellulose acetate was obtained having a tetrachlorethane-acetic acid (1:1) viscosity of 60 seconds. There was then added to the mass 17.1 pounds of 61.5% aqueous acetic acid to which also contained 0.78 pound of magnesium carbonate, this acetic acid being added over a period of 30 minutes. The mass was held at 130° F. for 2 hours and the temperature was then reduced to 115° and held at that temperature until a sample of the cellulose acetate precipitated from solution had an acetyl content of 39.3%.

We claim:

1. A process of preparing cellulose acetate which comprises pretreating cellulose containing 1–7% of water with a mixture of acetic acid and acetic anhydride at 80–180° F. for a time of at least 15 minutes which is insufficient to destroy more than 50% of the water in the cellulose, the acetic anhydride being 30–80% of the mixture and in an amount which will completely esterify the cellulose but not more than 3.5 parts per part thereof, cooling the mass consisting of pretreated cellulose, acetic anhydride, and acetic acid to 35–50° F., adding to the mass 5–12%, based on the cellulose of sulfuric acid catalyst whereby esterification is induced and regulating the esterification so that the temperature of the mass progressively rises to a maximum temperature within the range of 80–130° F. and continuing the esterification until the cellulose has been substantially completely acetylated.

2. A process of preparing cellulose acetate which comprises pretreating acetylation grade cotton linters containing 1–7% of water with a pretreatment bath consisting of acetic anhydride and acetic acid, the acetic anhydride being theoretically sufficient to completely esterify the cellulose but not more than 3.5 parts per part thereof, at a temperature within the range of 80–130° F. for a time of at least 15 minutes short of removal of more than ½ of the water from the cellulose, cooling the mass to 35–50° F. and inducing esterification by adding thereto 5–12%, based on the cellulose, of sulfuric acid catalyst, esterifying the cellulose with the temperature progressively increasing to a maximum within the range of 80–130° F. and continuing the esterification until the cellulose has been substantially completely acetylated.

3. A process of preparing cellulose acetate which comprises pretreating refined acetylation grade wood pulp containing 1–7% of water with a mixture consisting of acetic anhydride and acid, the acetic anhydride being at least sufficient to completely esterify the cellulose but no more than 3.5 parts per part thereof at 80–180° F. for a time of at least 15 minutes which which is insufficient to destroy more than ½ of the water in the cellulose, cooling the mass to 15–35° F. and inducing esterification of the cellulose by adding thereto 5–12%, based on the cellulose of sulfuric acid catalyst the temperature being allowed to proceed to a maximum temperature within the range of 80–130° F. and continuing the esterification until the cellulose is substantially completely acetylated.

4. A process of preparing cellulose acetate which comprises pretreating cellulose with a mixture of acetic anhydride and acetic acid at 80–180° F. for a time of at least 15 minutes but insufficient to destroy more than 25% of the water in the cellulose, cooling the mass to 35–50° F., adding thereto a solution of sulfuric acid in acetic acid, the sulfuric acid being 5–12%, based on the weight of the cellulose, carrying out the esterification so that the temperature of the mass reaches a maximum within the range of 80–130° F. and continuing the esterification until the cellulose is substantially completely acetylated.

5. A process of preparing hydrolyzed cellulose acetate which comprises pretreating cellulose having a moisture content of 1–7% with a mixture consisting of acetic anhydride and acetic acid, the acetic anhydride being sufficient to completely esterify the cellulose but not more than 3.5 parts per part thereof, at 80–180° F. for a time of at least 15 minutes but insufficient to remove more than ½ of the water from the cellulose, cooling the mass to 35–50° F. and adding thereto 5–12%, based on the cellulose of sulfuric acid catalyst in solution in acetic acid, and conducting the esterification whereby the reaction temperature progressively rises to a maximum temperature within the range 80–130° F. and the esterification is continued until the cellulose is substantially completely esterified, then adding to the mass aqueous acetic acid to impart a water content thereto which is insufficient to cause precipitation, partially neutralizing the catalyst and allowing the mass to stand for a time sufficient to hydrolyze the cellulose acetate therein to a selected acetyl content.

6. A process of preparing cellulose acetate which comprises pretreating 500 parts of wood pulp having a moisture content of approximately 2½% and a cuprammonium viscosity of 2,000–3,000 centipoises with a mixture consisting of 1,500 pounds of acetic anhydride and 3,005 pounds of acetic acid for ½ hour at 100° F., cooling the mass to 35° F. and adding thereto approximately 36 pounds of sulfuric acid in solution in acetic acid thereby inducing esterification of the cellulose which reaches a maximum esterification temperature within the range of 105–110° F. and continuing the esterification for 1½ hours from the addition of the catalyst.

7. A process of preparing cellulose acetate which comprises pretreating 500 parts acetylation grade cotton linters having a cuprammonium viscosity of 5,000–10,000 centipoises and a moisture content of approximately 2.4% with a mixture of 1564 pounds of acetic anhydride and 2870 pounds of acetic acid at 100° F. for 15 minutes, cooling the mass to 36° F. and inducing esterification of the cellulose by adding a solution of approximately 43.7 pounds of sulfuric acid in acetic acid thereto, the temperature of the mass increasing progressively up to a maximum of approximately 100° F. and continuing the esterification at that temperature for 1½ hours from the addition of the sulfuric acid catalyst.

References Cited in the file of this patent

UNITED STATES PATENTS

| | | |
|---|---|---|
| 2,379,310 | Malm et al. | June 26, 1945 |
| 2,539,586 | Martin et al. | Jan. 30, 1951 |
| 2,582,049 | Malm et al. | Jan. 8, 1952 |

FOREIGN PATENTS

| | | |
|---|---|---|
| 665,725 | Great Britain | Jan. 30, 1952 |